Patented Feb. 24, 1931

1,794,252

UNITED STATES PATENT OFFICE

HUGO SCHWEITZER, OF WIESDORF-ON-THE-RHINE, GERMANY, ASSIGNOR TO GENERAL ANILINE WORKS, INC., OF NEW YORK, N. Y., A CORPORATION OF DELAWARE

AZODYESTUFFS CONTAINING CHROMIUM AND PROCESS OF MAKING

No Drawing. Application filed February 21, 1929, Serial No. 341,840, and in Germany February 25, 1928.

The present invention relates to color lakes or pigment dyestuffs, and to a process of preparing same, more particularly, it relates to compounds of the following general formula:

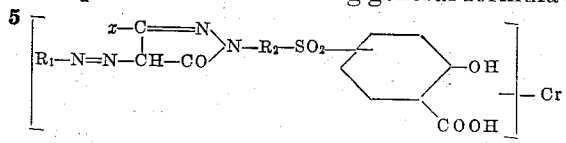

wherein $R_1$ stands for an aromatic nucleus, $x$ stands for the methyl or the carboxylic acid group, $R_2$ stands for a phenyl nucleus wherein $R_1$ and $R_2$ may be substituted, and wherein the salicylic acid radicle is attached to the sulfone group in ortho- or para-position in relation to the hydroxy group of the said radicle. By the symbol "Cr" in the specification and in the claims, I wish it not to be understood that one molecule chromium is attached to one molecule of the dyestuff, but "Cr" means that the dyestuff contains chromium in a complex combination; applicant cannot say with certainty in what combination the chromium is fixed, and in what quantity it is bound to one molecule of the dyestuff; there may be attached one molecule to one molecule of the dyestuff, or less or more.

My new compounds are obtainable by boiling the aqueous solution of a dyestuff of the general formula:

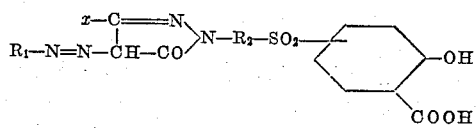

wherein $R_1$ stands for an aromatic nucleus, $x$ stands for the methyl or the carboxylic acid group, $R_2$ stands for a phenyl nucleus, wherein $R_1$ and $R_2$ may be substituted, and wherein the salicylic acid radicle is attached to the sulfone group in ortho- or para-position in relation to the hydroxy group of the said radicle (said dyestuffs being obtainable according to the U. S. Patent 1,685,071, issued September 18, 1928), with a watersoluble salt of trivalent chromium, such as chromium formate, chromium acetate, chromium fluoride, for some hours, that is to say, for about 2 to about 4 hours. The quantity of the chromium salt may be varied within wide limits, but at least one molecule of the chromium salt is used for each molecule of the dyestuff, generally I prefer to apply about one to two molecules. The dyestuffs is salted out from its solution in the usual manner, filtered and dried.

In the dry state, the new chromium complex compounds are yellowish powders which in the form of their alkali metal salts are watersoluble.

These new products, when dyed on wool are distinguished by yielding clear and greenish yellow shades, hitherto not obtainable in this manner, and they possess a very satisfactory capacity for even dyeing and are of very satisfactory fastness to light, fulling, perspiration, steaming and carbonization. They are also useful as lakes or pigment dyestuffs on account of their excellent fastness to light, water and lime.

The invention is illustrated by the following examples, but not limited thereto:

*Example 1.*—60.5 parts by weight of the azo dyestuff obtainable by coupling diazotized 2-chloro-4-toluidine with a pyrazolone compound of the following formula:

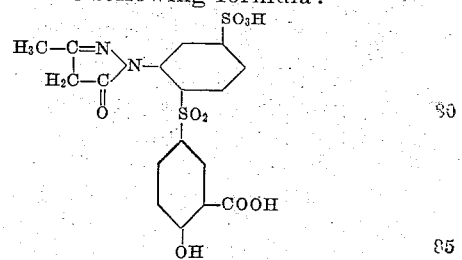

said dyestuff having in its free form the following formula:

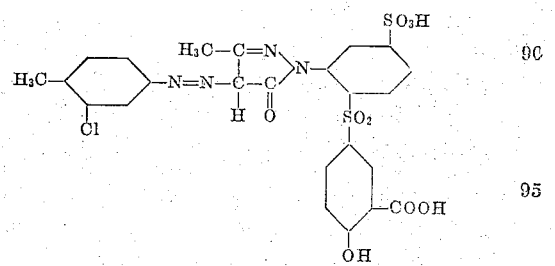

are boiled for several hours under a reflux condenser with a chromium formate solution (in the proportion of one molecule of dyestuff and 1–2 molecules of the chromium salt). The dyestuff solution is filtered and the product is salted out, filtered and dried.

The dyestuff dyes wool a greenish yellow shade, it displays a satisfactory capacity for even dyeing and the dyeing is fast to light, fulling, perspiration, steaming and carbonization.

*Example 2.*—62.5 parts by weight of the dyestuff prepared by coupling diazotized o-sulfanilic acid with a pyrazolone compound of the formula given in Example 1, said dyestuff having in its free form the following formula:

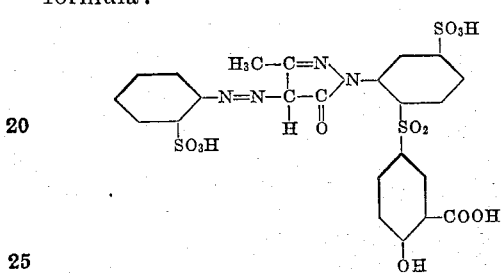

are converted into the chromium complex compound in the manner disclosed in Example 1 and isolated and worked up according to known methods.

The product dyes wool a greenish yellow tint, and displays fastness properties similar to those of the dyestuff obtained according to Example 1.

Complex chromium compounds of similar properties are obtainable from azodyestuffs formed by coupling diazo compounds of other aromatic bases, such as aniline, toluidines, xylidines, naphthylamines, or sulfonic acids, sulfonic acid amides and sulfonic acid anilides thereof, the halogen derivatives and carboxylic acids thereof and many others, with methylphenylpyrazolones or with the pyralozone carboxylic acids obtainable from 2-amino-4'-hydroxy-diphenylsulfone-3'-carboxylic acid, or sulfonic acids and other derivatives and substitution products thereof.

I claim:

1. The process which comprises heating in aqueous solution an azodyestuff of the general formula:

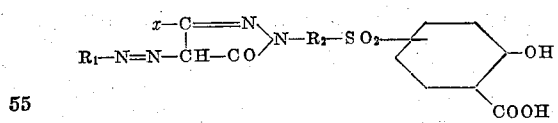

wherein $R_1$ stands for an aromatic nucleus, $x$ stands for the methyl or the carboxylic acid group, $R_2$ stands for a phenyl nucleus wherein $R_1$ and $R_2$ may be substituted, and wherein the salicylic acid radicle is attached to the sulfone group in ortho- or para-position in relation to the hydroxy group of the said radicle, with a water-soluble salt of trivalent chromium.

2. The process which comprises heating in aqueous solution an azodyestuff of the general formula:

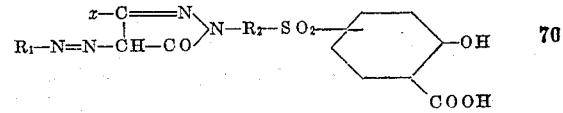

wherein $R_1$ stands for an aromatic nucleus, $x$ stands for the methyl or the carboxylic acid group, $R_2$ stands for a phenyl nucleus, wherein $R_1$ and $R_2$ may be substituted, and wherein the salicylic acid radicle is attached to the sulfone group or ortho- or para-position in relation to the hydroxy group of the said radicle, with at least an equi-molecular quantity of a watersoluble salt of trivalent chromium.

3. The process which comprises heating in aqueous solution one molecule of an azodyestuff of the general formula:

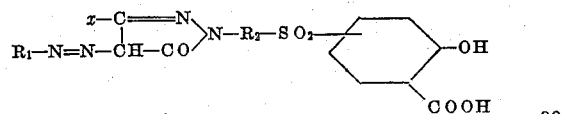

wherein $R_1$ stands for an aromatic nucleus, $x$ stands for the methyl or the carboxylic acid group, $R_2$ stands for a phenyl nucleus wherein $R_1$ and $R_2$ may be substituted, and wherein the salicylic acid radicle is attached to the sulfone group in ortho- or para-position in relation to the hydroxy group of the said radicle, with 1 to 2 molecules of a watersoluble salt of trivalent chromium.

4. The process which comprises heating in aqueous solution one molecule of the azodyestuff of the formula:

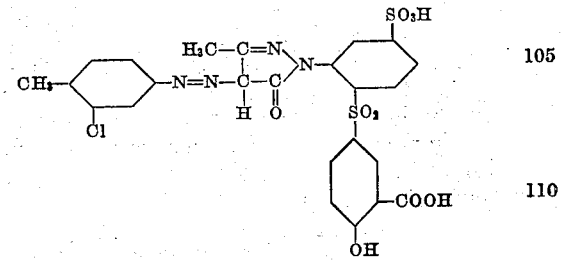

with 1 to 2 molecules of a watersoluble salt of trivalent chromium.

5. The process which comprises boiling for some hours an azodyestuff of the general formula:

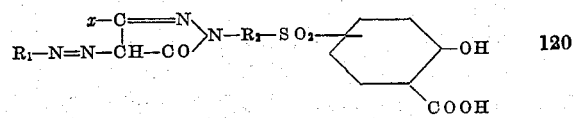

wherein $R_1$ stands for an aromatic nucleus, $x$ stands for the methyl or the carboxylic acid group, $R_2$ stands for a phenyl nucleus wherein $R_1$ and $R_2$ may be substituted, and wherein the salicylic acid radicle is attached to the sulfone group in ortho- or para-position in relation to the hydroxy group of the said radicle, with chromium formate in an aqueous solution 6. The process which comprises boiling for some hours an azodyestuff of the general formula:

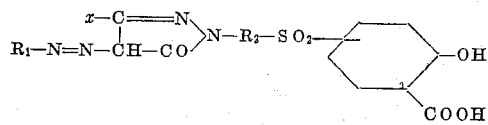

wherein $R_1$ stands for an aromatic nucleus, $x$ stands for the methyl or the carboxylic acid group, $R_2$ stands for a phenyl nucleus wherein $R_1$ and $R_2$ may be substituted, and wherein the salicylic acid radicle is attached to the sulfone group in ortho- or para-position in relation to the hydroxy group of the said radicle, with at least an equi-molecular quantity of chromium formate in aqueous solution.

7. The process which comprises boiling for some hours one molecule of an azodyestuff of the general formula:

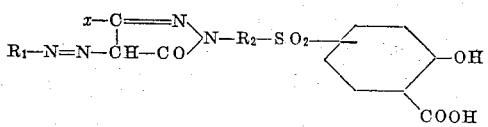

wherein $R_1$ stands for an aromatic nucleus, $x$ stands for the methyl or the carboxylic acid group, $R_2$ stands for a phenyl nucleus wherein $R_1$ and $R_2$ may be substituted, and wherein the salicylic acid radicle is attached to the sulfone group in ortho- or para-position in relation the hydroxy group of the said radicle, with 1 to 2 molecules of chromium formate in aqueous solution.

8. The process which comprises boiling for some hours one molecule of the azodyestuff of the formula:

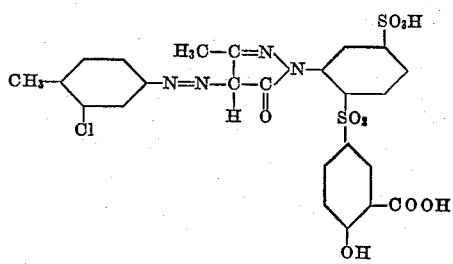

with 1 to 2 molecules of chromium formate in aqueous solution.

9. As new products azodyestuffs, containing chromium, of the general formula:

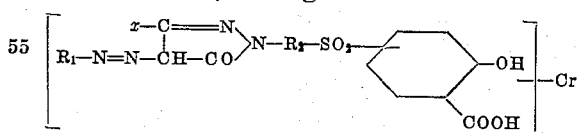

wherein $R_1$ stands for an aromatic nucleus, $x$ stands for the methyl or the carboxylic acid group, $R_2$ stands for a phenyl nucleus wherein $R_1$ and $R_2$ may be substituted and wherein the salicylic acid radicle is attached to the sulfone group in ortho- or para-position in relation to the hydroxy group of the said radicle said compounds being in a dry pulverized form yellowish powders, in the form of their alkali metal salts soluble in water, dyeing wool evenly clear, yellow shades of good fastness to light, fulling, perspiration, steaming and carbonization, and being suitable for use as lakes and pigment dyestuffs.

10. As a new product the azodyestuff, containing chromium, having in its free form the formula:

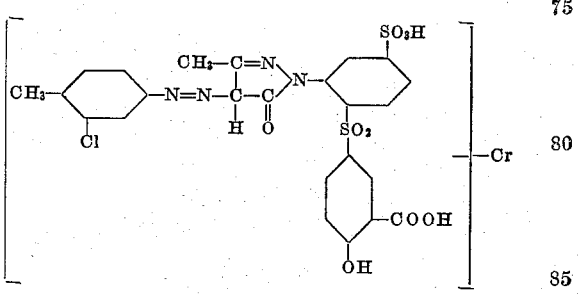

said dyestuff being in a dry pulverized form a yellowish powder, in form of its alkali metal salts soluble in water, dyeing wool greenish yellow shades of good fastness to light, fulling, perspiration, steaming and carbonization, and being suitable for use as a lake and pigment dyestuff.

In testimony whereof I have hereunto set my hand.

HUGO SCHWEITZER. [L. S.]